United States Patent
Geisler et al.

(10) Patent No.: US 8,051,640 B2
(45) Date of Patent: Nov. 8, 2011

(54) PROPULSION SYSTEM, OPPOSING GRAINS ROCKET ENGINE, AND METHOD FOR CONTROLLING THE BURN RATE OF SOLID PROPELLANT GRAINS

(76) Inventors: Robert L Geisler, Tehachapi, CA (US); Kevin E Mahaffy, Oak Hills, CA (US)

( * ) Notice: Subject to any disclaimer, the term of this patent is extended or adjusted under 35 U.S.C. 154(b) by 771 days.

(21) Appl. No.: 12/151,900

(22) Filed: May 9, 2008

(65) Prior Publication Data
US 2009/0320443 A1  Dec. 31, 2009

(51) Int. Cl.
*F02K 9/00* (2006.01)
(52) U.S. Cl. .............. 60/253; 60/254; 60/219; 60/234
(58) Field of Classification Search .............. 60/219, 60/234, 253–256
See application file for complete search history.

(56) References Cited

U.S. PATENT DOCUMENTS

| | | | | |
|---|---|---|---|---|
| 3,031,842 A * | 5/1962 | Ledwith | | 60/234 |
| 3,059,425 A * | 10/1962 | McSherry et al. | | 60/242 |
| 3,093,964 A * | 6/1963 | Hausmann | | 60/225 |
| 3,107,620 A * | 10/1963 | O'Donnell | | 102/289 |
| 3,143,853 A * | 8/1964 | Sobey | | 60/254 |
| 3,144,828 A * | 8/1964 | Woyt et al. | | 244/3.23 |
| 3,144,829 A * | 8/1964 | Fox | | 60/253 |
| 3,158,061 A * | 11/1964 | Lager | | 60/250 |
| 3,173,249 A * | 3/1965 | Wiggins | | 60/245 |
| 3,173,252 A * | 3/1965 | Ziegenhagen | | 60/234 |
| 3,185,036 A * | 5/1965 | Oeland, Jr. | | 89/1.812 |
| 3,195,302 A * | 7/1965 | Hughes et al. | | 60/253 |
| 3,216,193 A * | 11/1965 | Nagey et al. | | 60/234 |
| 3,221,495 A * | 12/1965 | Tweet | | 60/254 |
| 3,296,799 A * | 1/1967 | Fuentes | | 60/231 |
| 3,491,692 A * | 1/1970 | Blankenagel | | 102/377 |
| 3,529,425 A * | 9/1970 | De Haye | | 60/254 |
| 3,942,319 A * | 3/1976 | Sayles | | 60/253 |
| 4,311,005 A * | 1/1982 | Hurd et al. | | 60/253 |
| 4,397,149 A * | 8/1983 | Kosaka et al. | | 60/254 |
| 4,686,824 A * | 8/1987 | Dunaway et al. | | 60/231 |
| 4,956,971 A * | 9/1990 | Smith | | 60/245 |
| 4,999,997 A * | 3/1991 | Grosgebauer et al. | | 60/256 |
| 5,119,627 A * | 6/1992 | Bradford et al. | | 60/251 |
| 5,160,070 A * | 11/1992 | Hibler et al. | | 60/250 |
| 5,309,712 A * | 5/1994 | Mund, Jr. | | 60/253 |
| 5,613,358 A * | 3/1997 | Humiston et al. | | 60/250 |
| 6,016,652 A * | 1/2000 | Smith et al. | | 60/251 |
| 7,000,377 B1 * | 2/2006 | Knight | | 60/225 |
| 2010/0275576 A1 * | 11/2010 | Gutman et al. | | 60/204 |

\* cited by examiner

Primary Examiner — William Rodriguez
(74) Attorney, Agent, or Firm — Townsend & Banta

(57) ABSTRACT

A solid propellant thrust control system, method, and apparatus for controlling combustion of solid propellants in an opposing grains solid propellant rocket engine (OGRE) is provided. In particular, an opposing grains rocket engine and propulsion system is provided, in which actuator means connected are connected to solid propellant grains disposed in the pressure vessel of the engine. The actuator means are operable to selectively move the solid propellant grains together or apart relative to one another, such that the burning ends of the solid propellant grains decrease or increase relative to one another. This action controls the rate of combustion of the solid propellant grains by varying spacing distance between the burning ends of the solid propellant grains, and enables extinguishment and reignition of the OGRE. Further, a method is providing for controlling the burn rate of solid propellant grains undergoing combustion in an opposing grains rocket engine.

24 Claims, 11 Drawing Sheets

4 Required depressurization rate for extintion: experimental heoretical results (adapted from Ref. 13).

PROPULSION SYSTEM, OPPOSING GRAINS ROCKET ENGINE, AND METHOD FOR CONTROLLING THE BURN RATE OF SOLID PROPELLANT GRAINS

STATEMENT OF GOVERNMENT INTEREST

This invention was in part made with government support under contracts FA9453-04-C-0315 and HQ0006-07-C-7726 awarded by the Missile Defense Agency. The government has certain rights in the invention.

FIELD OF THE INVENTION

The present invention relates in general to solid propellant rocket motors and gas generators in solid propellant rockets and, more particularly, to a solid propellant thrust control system, method, and apparatus for controlling combustion of solid propellants in an opposing grains rocket engine (OGRE).

DESCRIPTION OF RELATED ART

Solid rockets have traditionally been extremely difficult to control in terms of precision, throttleability, and response time. Traditional methods of control have used large, heavy hot gas valves, which limit the rocket to lower performing, low condensed phase particulate, cool-burning propellants. These methods control the burning or mass-evolution rate by changing the chamber pressure, which in-turn varies the standoff distance of the flame zone (1-2 mm) from the solid propellant surface. This in-turn varies the heat-feedback, and hence the recession rate of the propellant (see "Fundamentals of Solid-Propellant Combustion" Kenneth K. Kuo, Martin Summerfield, *Progress in Astronautics and Aeronautics*, Vol. 90, p. 891, October 1984, Amer Inst of Astronautics & Aeronautics).

Further, combustion control using valves is limited by the high temperature capability of the construction materials, which, in turn, often requires the use of lower temperature propellants having lower performance. In addition, the valves add complexity, require significant development time, increase weight, cost, and electric power consumption while decreasing system reliability. Valves also require cleaner, lower performing propellant gases as compared to higher performing propellants using metals and metal hydrides that produce condensed phase oxide combustion products.

In addition to the above deficiencies of valves to control combustion, unlike the present invention, hot gas valves are incapable of enabling multiple cycles of extinguishment and reignition. In particular, when using hot gas valves to control combustion, a new pyrotechnic igniter must be provided for each ignition event, as each pyrotechnic igniter is destroyed during said event. Thus, a mechanism for insertion of a new pyrotechnic igniter must further be provided, thereby adding to the cost and complexity of the system.

Further conventional methods used to control solid rocket combustion include changing the throat vent area of the motor with a hot-gas valve, or pulsing the burning by inhibiting and then igniting new propellant burn area. Energy management of solid rockets is sometimes achieved by sudden depressurization of the chamber by opening vent holes or valves.

Another alternative controllable rocket engine is an OGRE (opposing grains rocket engine). In such OGRE engines, solid propellants may be extinguished by creating a sudden imbalance in the heat feedback from the flame zone a few hundred microns above the propellant surface, and the unburned propellant a few hundred microns below the surface engines. This transient condition is typically created by suddenly venting the solid rocket motor combustion chamber gas, creating a depressurization condition known as dp/dt. Typical propellants such as the OGRE compositions operating at a chamber pressure of 1,000 psia are extinguished at a negative dp/dt of about 165,000 psi/sec, as shown in FIG. 11 (see Kenneth K. Kuo, Martin Summerfield, "Fundamentals of Solid Propellant Combustion", *Progress in Astronautics and Aeronautics*, Vol. 90, pp. 661-732, October 1984, Amer Inst of Astronautics & Aeronautics).

Accordingly, it is an object of the present invention to provide a system and apparatus capable of controlling the thrust of a solid propellant rocket engine, on command, without the use of conventional large, heavy valves.

It is a further object of the present invention to provide a system and apparatus capable of generating hot gases on command, without the use of conventional, heavy valves.

It is yet a further object to provide an opposing grain rocket engine capable of achieving the above objects.

BRIEF SUMMARY OF THE INVENTION

After considerable experimentation and development, the present inventors developed a novel propulsion system, in particular, an opposing grain rocket engine (OGRE), which is capable of directly controlling the burning rate of the propellant upon command by physically controlling the height of the flame zone through precision movement of burning ends of opposing grains of propellant material over a range of a few millimeters. Such a propulsion system is not limited to the application of a rocket engine, but rather may be utilized more generally as a gas generator in various mechanical/industrial applications. It is well known that extinguishment occurs if the flame zone is rapidly dispersed. Classically this is done by dp/dt, i.e., changing pressure over time. In contrast, with the OGRE of the present invention, extinguishment can be effected by sudden retraction (dv/dt).

Namely, the present inventors unexpectedly discovered that physically collapsing the flame zone produces the same effect as a pressure rise for a given base rate. The base rate can also be changed several fold with catalysts and exothermic fuels, such as metals. Some experimental tests conducted by the present inventors have demonstrated that this can produce up to a 30-40-fold rate change or turndown ratio. In fact, an infinite turndown ratio was experimentally demonstrated, i.e., the system and apparatus of the present invention was applied to produce full thrust in a rocket engine, extinguish the rocket engine, reignite the rocket engine, and produce full thrust again.

In particular, for OGRE extinguishment, the same transient extinguishment conditions as pressure rise were produced by a rapid retraction of the opposed grains, causing a sudden change in combustion zone volume by dv/dt. In one experiment, the present inventors determined that a relative grain retraction rate sufficient to cause extinguishment at a constant burning surface area was 50.8 millimeters/second (or 50,800 microns/second). This retraction rate (for certain propellants) causes the flame zone to increase about forty fold in thickness in a second, thus nearly instantaneously disbursing its energy to one-fortieth of its steady-state content and resulting in extinguishment.

Further, the present inventors discovered that with the proper tailoring of propellant pairs forming the combustion gap, that either a Proportionally Controlled (PC) or a Pulse-Duration-Modulation (PDM) solid propellant engine can be built. Moreover, the present invention discovered that the burning rate could be controlled by shaping the propellant grain surface in order to have more surface area. For example, in a preferred embodiment, one propellant grain may be shaped like a male cone, and an opposing fuel grain as a female cone.

In the PC solid propellant engine, the mass flow rate or thrust can be controlled by linearly opening up the combustion gap and linearly reducing the propellant burning rate due to a reduction in heat feed-back. The thrust can be reduced to a very low level or zero, and the engine is similarly powered up by closing the gap. In the PDM mode, the burning is extinguished by suddenly closing the gap to zero whereupon the remaining gaseous products are vented and combustion is resumed by withdrawing the grains and reigniting either from residual heat or a pilot light system.

In a general embodiment of the present invention, the propellant combustion gases are trapped in an extremely narrow (0-2 mm) gap between two moveable walls of propellant, thereby modulating its heat feedback to the burning surface of the propellant. Employing the process of the present invention enables the use of:

a. Physical separation of propellant into the two identical or dissimilar composition grains for purposes of staged combustion and/or chemical compatibility. The grains may be of identical or different diameters or geometries depending upon the desired contact area. The individual grains can also be hermetically sealed prior to their ignition;

b. Reduction of undesirable metal droplet agglomeration due to high flow velocities and shear in the gap and early droplet ignition;

c. Secondary injection of liquids and gases through the actuator arms. These injected gases or liquids may be additional propellant materials or catalysts. This adds flexibility of propellant ingredient usage not otherwise found in other motor or engine designs;

d. In the case of liquid fuel injection into the gap, the liquid may be carbureted into extremely fine droplets due to either high velocity flow and/or spinning of the opposing disks; and e. The grain separation can enhance the Insensitive Munition (IM) aspects of the rocket by physical separation of mutually reactive ingredients. Namely, by physically separating the two reactive components (oxidizer and fuel) of the solid rocket engine/gas generator, a munition having a low sensitivity is provided. Further, such grain separation and balance of propellants serves to limit flame propagation into cracks or fissures in the propellant grains.

Accordingly, in a first preferred embodiment of the present invention, a propulsion system (which can also be utilized as a gas generator) is provided, comprising:

(a) a pressure vessel having an interior and exterior,
(b) a rocket nozzle connected to the pressure vessel,
(c) propellant slidably disposed within the interior of the pressure vessel, said propellant comprising at least two discrete solid propellant grains positioned in an end to-end spaced relationship and being movable relative to one another, and
(d) one or more actuator means connected to said solid propellant grains, said actuator means being operable to selectively move burning ends of solid propellant grains relative to one another, whereby to control rate of combustion of the solid propellant grains by varying spacing distance between the burning ends of the solid propellant grains.

In a second preferred embodiment of the present invention, the propulsion system of the first embodiment above is provided, which can be throttled up by moving the burning ends of the solid propellant grains closer together, whereby to increase erosive burning and increase pressure of combustion gases inside the pressure vessel.

In a third preferred embodiment of the present invention, the propulsion system of the first embodiment above is provided, which can be throttled down and/or extinguished by moving the burning ends of the solid propellant grains further apart, thereby decreasing or eliminating erosive burning and decreasing pressure of combustion gases inside the engine.

In a fourth preferred embodiment of the present invention, the propulsion system of the first embodiment above is provided, further having an actuator means, which is connected to each solid propellant grain, said actuator means being operable to simultaneously slide a plurality of the solid propellant grains relative to one another within the pressure vessel, whereby to vary spacing between the burning ends of the solid propellant grains.

In a fifth preferred embodiment of the present invention, the propulsion system of the first embodiment above is provided, having an actuator means, which is responsive to temperature and/or pressure of combustion gases in the engine.

In a sixth preferred embodiment of the present invention, the propulsion system of the first embodiment above is provided, having two solid propellant grains slidably disposed inside the interior of the pressure vessel, and actuator means connected to each of the solid propellant grains to effect sliding movement of the solid propellant grains.

In a seventh embodiment of the present invention, the propulsion system of the first embodiment is provided, wherein one propellant grain is shaped like a male cone, and an opposing fuel grain as a female cone. This provides an increase in burning surface area for a given space, and allows further control of the burning rate of the propellants.

In an eighth embodiment of the present invention, the propulsion system of the first embodiment above is provided, wherein at least one propellant grain is oxidizer rich, and at least one propellant grain is fuel rich. In this preferred embodiment, the OGRE effect is obtained regardless of the fact that the propellant grains are fuel rich, or are oxidizer rich.

In a ninth embodiment of the present invention, the propulsion system of the first embodiment above is provided, wherein at least one propellant grain is comprised of a nitramine, such as RDX and/or HMX, and at least one other propellant grain is comprised of ammonium perchlorate (AP). In such preferred embodiment, the propellant grain comprising AP decomposes into perchloric acid and ammonia, and the propellant grain comprising RDX and/or HMX decomposes into nitrogen dioxide and formaldehyde. The oxidizing species from each propellant grain have an affinity for the decomposition products of the opposing grain. This type of combustion environment provides great environment for rapid and effective combustion of metal fuels.

In a tenth embodiment of the present invention, the propulsion system of the first embodiment above is provided, wherein the propellant grains are formulated to be standard stoichiometrically formulations.

In an eleventh preferred embodiment of the present invention, an opposing grains rocket engine is provided comprising:

(a) a pressure vessel,
(b) two opposed solid propellant grains slidably disposed in the pressure vessel,
(c) a rocket nozzle connected to the pressure vessel, and
(d) one or more actuator means operable to move the two opposed solid propellant grains relative to one another in the pressure vessel, whereby to vary spacing between burning ends of the solid propellant grains.

In a twelfth preferred embodiment of the present invention, the opposing grains rocket engine of the eleventh embodiment above is provided, wherein the one or more actuator means is/are operable to throttle up the engine by sliding closer together the two opposed solid propellant grains, so as to decrease spacing between the burning ends of the solid propellant grains and increase erosive burning and the pressure of combustion gases in the engine.

In a thirteenth preferred embodiment of the present invention, the opposing grains rocket engine of the eleventh embodiment above is provided, wherein the one or more actuator means is/are operable to throttle down or extinguish combustion in the engine by sliding further apart the solid propellant grains, whereby to increase spacing between the burning ends of the solid propellant grains and decrease erosive burning and pressure of combustion gases in the engine. In a most preferred embodiment, the opposing grains are moved apart relatively rapidly apart. For example, when the opposing grains are moved apart at a rate of about 50,000 microns/sec., so as to cause the opposing grains having an initial gap of 1,500 microns, to move apart so as to have a gap therebetween of about 12,000 microns, combustion is extinguished. Some OGRE propellant combinations will burn on their own if pulled apart slowly, but will extinguish if pulled apart rapidly. Rapid withdrawal of the grains literally lifts the burning flame structure right off of the surface of the propellant leading to extinguishment.

In a fourteenth preferred embodiment of the present invention, the propulsion system of the first embodiment above is provided, wherein the rocket nozzle is positioned at about a center of gravity of the engine, and the one or more actuator means is/are operable to move the two opposed solid propellant grains toward the center of gravity as the solid propellant grains are consumed, so as to maintain constant the center of gravity of the engine.

In a fifteenth preferred embodiment of the present invention, the opposing grains rocket engine of the eleventh embodiment above is provided, wherein as the two opposed solid propellant grains are consumed, their burning ends are moved toward one another at a rate approximating the combustion of the solid propellant grains, thus maintaining constant the center of gravity of the rocket engine.

In a sixteenth preferred embodiment of the present invention, the opposing grains rocket engine of the eleventh embodiment above is provided, further having a pyrotechnic igniter disposed adjacent the solid propellant grains, whereby to initiate ignition of solid propellant grains.

In a seventeenth preferred embodiment of the present invention, the opposing grains rocket engine of the eleventh embodiment above is provided, having an elongated fuel-rich solid propellant grain with a first end and a second end opposite the first end positioned at about a center of gravity of the engine, oxidizer-rich solid propellant grains positioned adjacent each end of the fuel-rich solid propellant grain in an end-to-end relationship, and the one or more actuator means operable to move the burning ends of both oxidizer-rich solid propellant grains relative to the burning ends of the fuel-rich solid propellant grain.

In an eighteenth preferred embodiment of the present invention, the opposing grains rocket engine of the eleventh embodiment above is provided, having a means for equalizing pressure within the pressure vessel via facilitation of flow of combustion gases. The present inventors unexpectedly discovered that equalized pressure greatly reduces the force required from the actuator. Further, the smaller the actuator force required to move the opposing solid propellant grains, the smaller and lighter the actuator required. Moreover, the smaller the actuator required, the lower the power required to operate the actuator, thereby providing longer operating time or a smaller/lighter battery.

Accordingly, in a more preferred embodiment according to the seventeenth embodiment above, one or more pipes are provided within, adjacent and/or in communication with the pressure vessel, said pipes operable to allow flow of combustion gases within the pressure vessel. In another more preferred embodiment, a void space is provided between an interior side wall of the pressure vessel and the solid propellant grains, whereby to facilitate flow of combustion gases and equalization of pressure in the engine. Equalizing pressure is important, as it greatly reduces the force required by the actuator to move the propellant grains. The smaller the actuator force needed, the smaller/lighter actuator is needed. The smaller the actuator, the lower the power required. This gives either longer operating time or a smaller/lighter battery.

In a nineteenth preferred embodiment of the present invention, a method is provided for controlling the burn rate of solid propellant grains undergoing combustion in an opposing grains rocket engine, in which combustion gases from burning propellant grains are discharged through a rocket nozzle connected to the rocket engine, the method comprising:

moving burning surfaces of at least two discreet solid propellant grains relative to one another to vary a distance or spacing between burning ends of the solid propellant grains, thereby adjusting the rate of burning of the solid propellant grains.

In an twentieth preferred embodiment of the present invention, a method is provided for throttling up the burn rate of solid propellant grains undergoing combustion in an opposing grains rocket engine by moving burning ends of the solid propellant grains closer together, whereby to increase erosive burning and heat flux to burning surfaces and effect an increase in pressure of combustion gases in the engine.

In a twenty first preferred embodiment of the present invention, a method is provided for throttling down the burn rate of solid propellant grains undergoing combustion in an opposing grains rocket engine by moving burning ends of the solid propellant grains farther apart, whereby to decrease erosive burning and heat flux and decreasing pressure of combustion gases in the engine.

In a twenty second preferred embodiment of the present invention, a method is provided for extinguishing combustion of solid propellant grains in the rocket engine by moving further apart burning ends of the discreet solid propellant grains. In a most preferred embodiment, the opposing grains are moved apart relatively rapidly apart. For example, when the opposing grains are moved apart at a rate of about 50,000 microns/sec., so as to cause the opposing grains to have an initial gap of 1,500 microns, have a gap therebetween of about 12,000 microns, combustion is extinguished.

Some OGRE propellant combinations will burn on their own if pulled apart slowly, but will extinguish if pulled apart rapidly. Rapid withdrawal of the grains causes a sudden increase of the flame-zone volume with time, and literally lifts the burning flame structure right off of the surface of the propellant, leading to thermal imbalance and extinguishment. Propellant grains that are moved rapidly to extinguish same are those that stoichiometrically balanced. An example of such a composition is a formulation of 88% ammonium perchlorate (AP) and the balance thereof a binder, such as HTPB (hydroxyl-terminated polybutadiene). An example of a propellant grain that requires rapid separation of the two or more propellant grains to extinguish combustion is a composite solid propellant based on ammonium perchlorate, strontium nitrate, magnesium, aluminum, and hydroxy terminated polybutadiene (i.e., oxidizer rich and fuel rich).

In a twenty third preferred embodiment of the present invention, a method is provided for moving ends of opposed solid propellant grains relative to one another by actuator means connected to the solid propellant grains.

In a twenty fourth preferred embodiment of the present invention, a method is provided for maintaining approximately constant the center of gravity of an opposing grains rocket engine during operation by moving opposed solid propellant grains with actuator means toward a center of gravity of the rocket engine, whereby to maintain approximately constant the center of gravity of the engine during burning and consumption of the solid propellant grains.

DETAILED DESCRIPTION OF THE INVENTION

Figure 1:
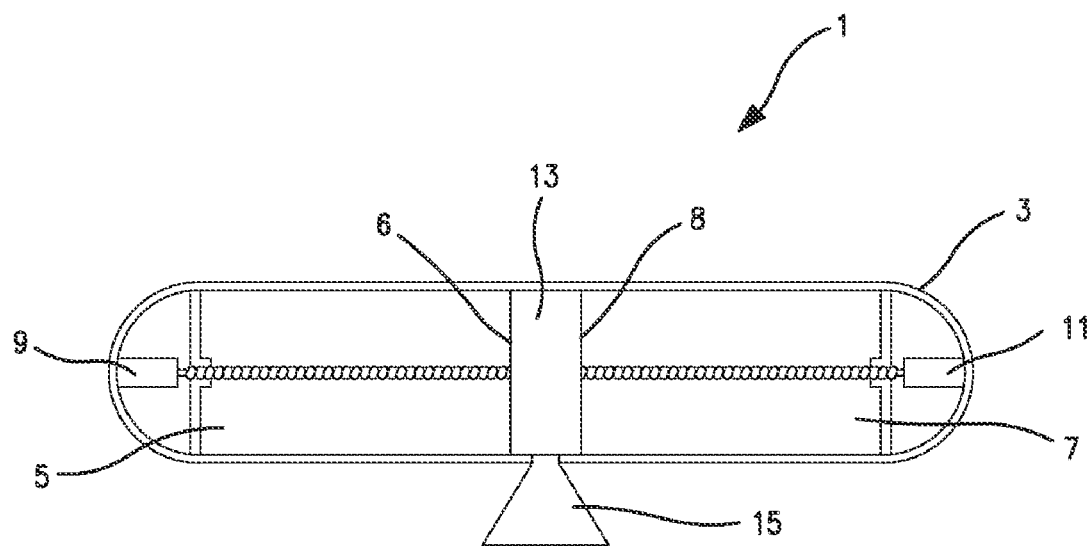
FIG. 1 is a cross-sectional view of an opposing grains rocket engine of the present invention, illustrating the configuration and location of propellant grains and actuators.

The basic configuration of an opposing grains rocket engine (OGRE) of the present invention shown generally at 1 in FIG. 1 consists of an outer rocket casing or pressure vessel 3 containing two separate and discrete solid propellant grains 5 and 7. To each of the solid propellant grains 5 and 7 is attached an actuator 9 and 11, respectively, to move the propellant grains with respect to one another, i.e., to extend or retract the solid propellants in a controlled manner to vary the spacing between burning ends 6 and 8 to effect a controlled rate of burn. By controlling gap 13 between burning ends 6 and 8 of propellant grains 5 and 7, the rate of combustion of propellant grains 5 and 7, and resultant discharge of propellant gases from a nozzle 15 can be controlled.

Figure 2A:
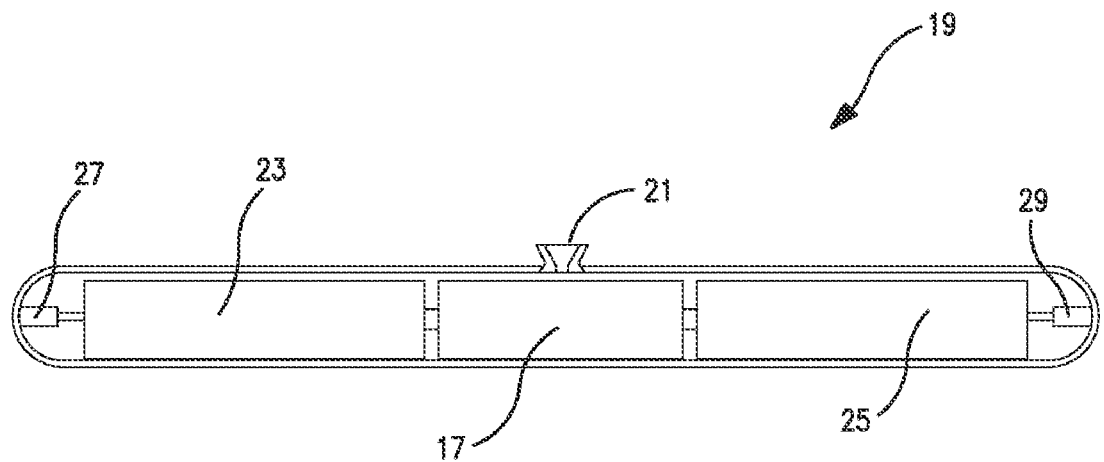
FIG. 2(a) is a cross-sectional view of an opposing grains rocket engine of the present invention used in a divert and attitude control system thruster, illustrating the use of three discrete propellant grains having two separate combustion zones.

Although FIG. 1 illustrates the use of two opposing propellant grains, the number of propellant grains used in the opposing grains rocket engine of the present invention is not limited to two. For example, a rocket engine used in a divert and attitude control system thruster, such as illustrated in FIG. 2(a), comprises three discrete propellant grains having two separate combustion zones. In a preferred embodiment, the middle propellant grain is fuel rich, and the side grains are oxidizer rich.

An important aspect of the present invention is manipulating the flame zone. This is achieved by the present invention in various ways, including the moving of the opposing grains via actuators. The present inventors conducted various tests of the performance of the OGRE of the present invention using, for example, the prototype 31 shown in FIGS. 3-5, and the prototype shown in FIG. 6. In particular, the prototype thruster 31 included two ball screw actuators 33 and 35 in connection with propellant grains 49 and 51, respectively, so as to be capable of moving same. These propellant grains 49 and 51 were encased in the combustion chamber 37. Upon initiation (burning), the propellant gases were expelled into the post-combustion chamber 45, and through the nozzle 47.

Figure 6:
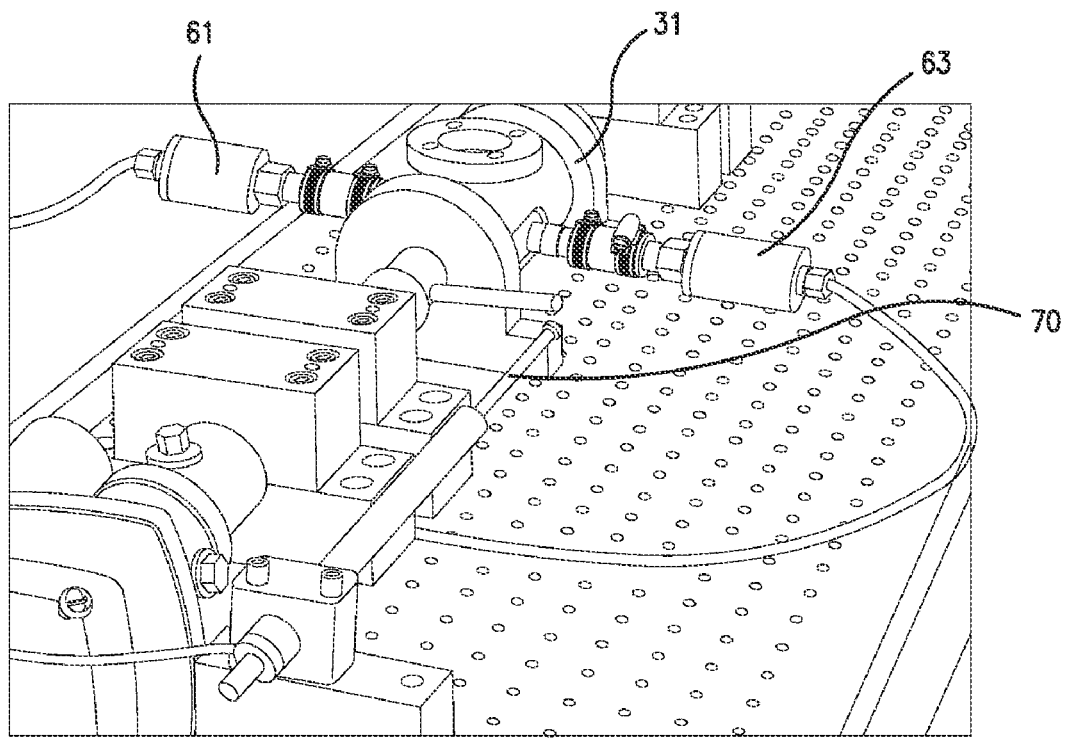
FIG. 6 is a perspective view of a prototype opposing grains rocket engine of the present invention, illustrating a linear variable displacement transducer used to calibrate the displacement of the actuators.

As illustrated in FIG. 6, the OGRE prototype thruster included a pressure transducer 61, a thermocouple 63, and a linear variable displacement transducer 70. Through the use and testing of such prototype, among various other discoveries, the present inventors discovered that the burn rate of the propellant grains may be controlled by manipulating the surface area thereof, i.e., forming the propellant grains in various configurations, so as to control the burn rate of propellant.

Figure 10:
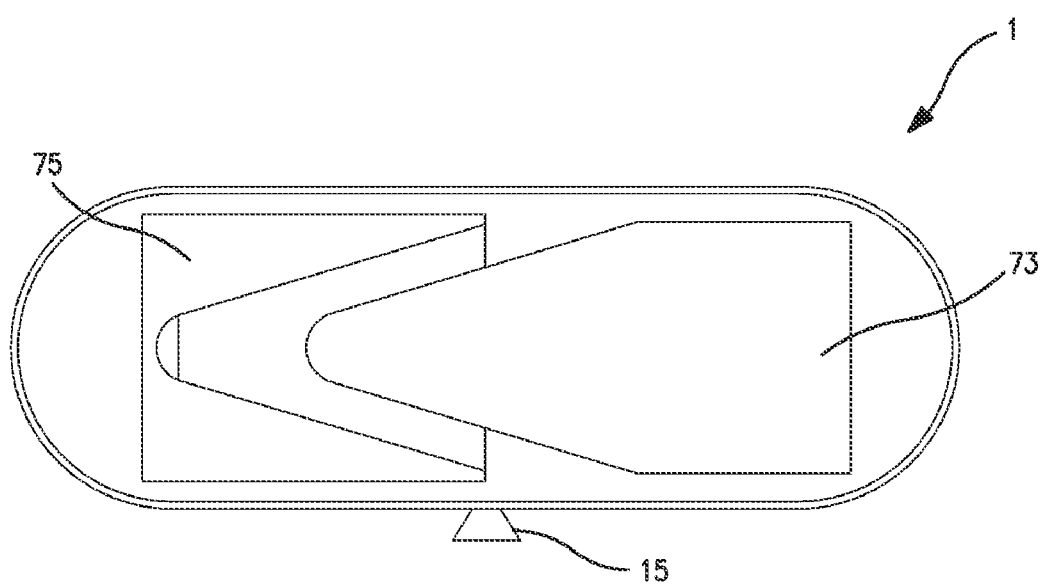
FIG. 10 is a cross sectional view of an opposing grains rocket engine of the present invention, wherein one propellant grain has a male cone shape, and an opposing fuel grain has a female cone shape, so as to provide increase surface area (and control of burn rate).
Figure 11:
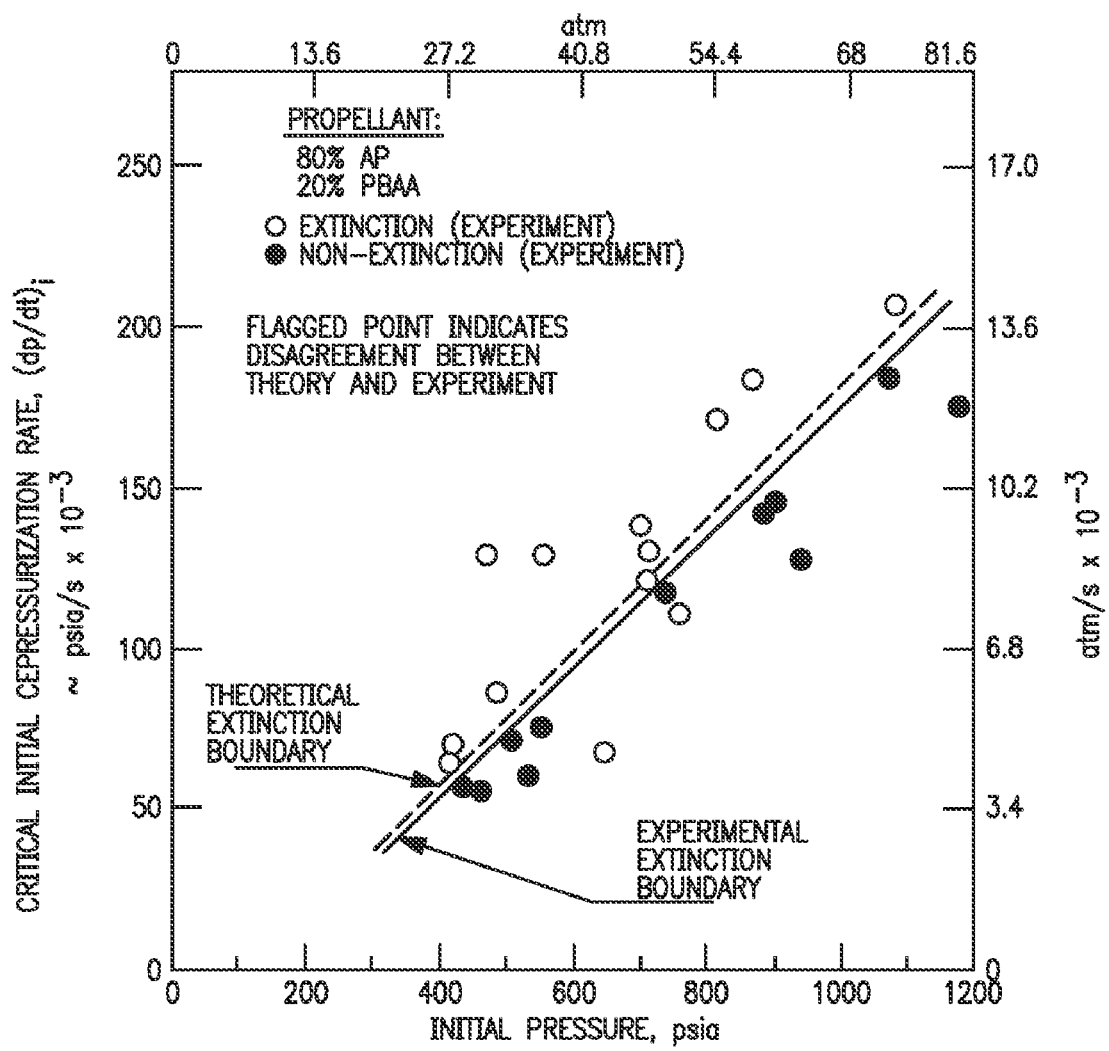
FIG. 11 is a graph illustrating the required depressurization rate for solid propellant extinction.

For example, as illustrated in FIG. 10, one propellant grain may be provided in the shape of a male cone 73, and an opposing fuel grain may be provided in the shape of a female cone 75. However, a multitude of propellant grain shapes may be utilized, so as to manipulate the surface area, and accordingly the burning surface and burn rate of the opposing propellant grains. This preferred embodiment allows further control of the burning rate of the propellants.

In an OGRE-based system of the present invention, the mechanical action of bringing burning ends of solid propellant into close physical proximity has the same effect as increasing chamber pressure. That is, the various zones of the combustion process are compressed closer to the burning surface. In addition, the radiant/thermal energy and elements of chemistry of one grain will interact with the opposing grain in this narrow gap. In this condition, the propellant mass generation rate begins to approach the maximum dictated by the combustion enthalpy of the formulation. In effect, this is the burn rate that would be achieved at infinite chamber pressure. It represents the maximum high throttle point of the system.

There are other physical effects, which help to increase the burn rate sensitivity and performance of the OGRE system. One such effect is erosive burning, which takes place when the Mach number of gases flowing over the surface of a solid propellant grain increases to high levels. This high-speed flow has the effect of greatly accelerating the burn rate of the solid propellant. The effective burn rate of the propellant becomes the sum of the typical burn rate at a given chamber pressure, plus the mass of propellant being eroded from the surface by the effects of the high-speed gas flow.

Erosive burning is an important aspect of OGRE solid rockets. This is due to the fact that, as the two propellant grains in an OGRE rocket come together, a narrow gap is created and filled with hot, combusting gases. These hot, combusting gases will immediately begin flowing towards the rocket's nozzle. This environment generally creates sonic or near-sonic gas flow, thus leading to erosive burning with its consequent increase in burning rate.

The exact physics of erosive burning of a solid propellant is still in dispute. However, it seems clear that erosive burning will have a greater effect on the oxidizer-rich propellant grains used in OGRE rocket motors than it will on the fuel-rich grains. This is fortuitous, because the majority of the mass that needs to be generated during combustion comes from these oxidizer-rich propellant grains.

These propellant grains can be moved closer or further away from each other by actuators 9 and 11. Moving the propellant grains closer together generally has the effect of throttling up, or increasing, the rate of combustion (burn rate) of solid propellants 5 and 7. The end-burning grains are pushed towards the center of the motor 1 as the propellant is consumed. This has two primary advantages. First, it keeps the combustion event adjacent the thruster nozzle 15. Second, it allows the system to maintain constant its center of gravity at the centerline of the thrust.

There are two approaches to energy management in an OGRE thruster. The thruster can be throttled down, or it can operate according to pulsing (a rapid extinguishment reignition duty cycle). The approach used on a given system will be dictated by the requirements of the mission. When it is desired to throttle the system down, opposing grains 5 and 7 can be moved further apart. This results in a reduction of the "infinite chamber pressure-like" condition, and hence, a reduction in the burn rate. The reduced burn rate results in reduced chamber pressure, thus lowering the burn rate further. The motor will then throttle down to its new operating equilibrium.

As discussed above, it is well known that solid propellants will extinguish if the flame zone is rapidly dispersed. This is classically achieved by rapid depressurization of the combustion chamber, which tends to lift the combustion process up off of the burning surface (i.e., the burning end of the propellant grains), causing the combustion process to cool and extinguish. In a similar manner, the OGRE motor of the present invention achieves the same results by rapidly moving the opposing grains 5 and 7 away from one another. The present inventors discovered that rapid reignition of the extinguished propellant grains is possible when using the OGRE of the present invention, as long as a given maximum dwell time is not exceeded.

In a preferred embodiment, a case bonded fuel-rich propellant grain 17 (shown in FIG. 2(*a*)), as mentioned briefly above, is disposed in the center of the rocket motor 19, directly below (or above) the nozzle 21. Oxidizer-rich propellant grains 23 and 25 are divided into two parts, one disposed on the left side (23) and one disposed on the right side (25) of the motor 19 as shown in FIG. 2(*a*). The oxidizer-rich grains 23, 25 are actuated toward the fixed fuel-rich grain 17 in the center of motor 19. This doubles the burning surface area, with one combustion zone on the left side of the fuel-rich propellant grain 17, and a second on the right side of the fuel-rich propellant grain 17. Actuators 27 and 29 are used to move propellant grains 23, 25, respectively.

Equalizing pressure is important in OGRE rocket engines, as it greatly reduces the force required by the actuator to move the propellant grains. The smaller the actuator force needed, the smaller/lighter actuator is needed. The smaller the actuator, the lower the power required. This gives either longer operating time or a smaller/lighter battery. FIG. 2(*b*) illustrates a preferred embodiment in which propellant grains indicated generally at 30 have a flattened top surface 32. The flattening of the top surface of the propellant grains provides a void space for gas flow and pressure equalization during the combustion process. Such a propellant grain may be utilized in any variation of the OGRE of the present invention.

Figure 9:
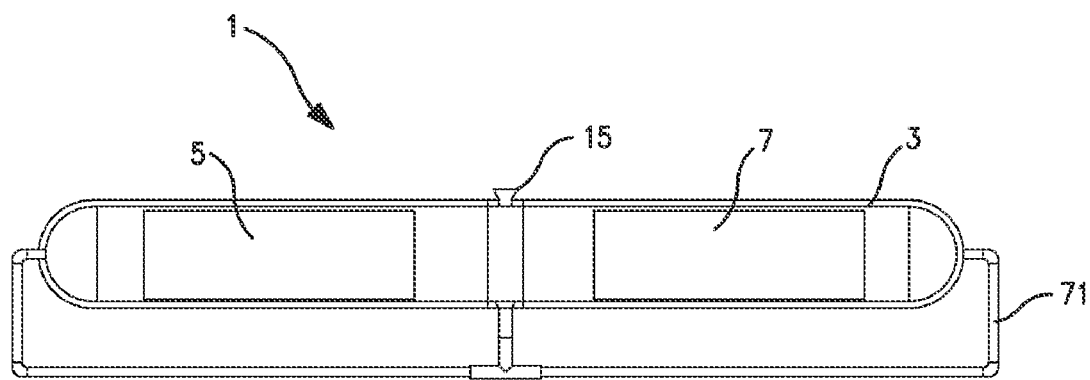
FIG. 9 is a cross sectional view of an opposing grains rocket engine of the present invention, illustrating a means (pipes) for equalizing pressure within the pressure vessel via facilitation of flow of combustion gases.

As shown in FIG. 9, another pressure equalization means includes the provision of pipes to enable the flow of combustion gases, for equalizing pressure within the pressure vessel 3 via facilitation of flow of combustion gases. In particular, one or more pipes 71 are provided within, adjacent and/or in communication with the pressure vessel 3. These pipes 71 allow the flow of combustion gases within the pressure vessel.

Conventional controllable solid rocket motor technologies, such as pintles and hot gas valves, typically require significant compromises with respect to solid propellant composition and performance. Propellants are typically formulated with low flame temperatures and low erosive properties. For example, low performance solid oxidizers, such as ammonium nitrate (and even lower performing oxidizers,) are used instead of industry state-of-the-art oxidizers, such as ammonium perchlorate. This causes the propellant to suffer both in specific impulse and in density specific impulse performance.

Another significant limitation of conventional controllable motors is that they cannot tolerate the high temperature and erosive nature of metal fuels in the solid propellant. The addition of metal fuels, such as aluminum, generally can increase specific impulse in the range of about 1-20%, and density specific impulse by about 6-26%.

In contrast, the opposing grains rocket engine (OGRE) of the present invention operates successfully with even high loadings of metal fuels, such as aluminum and magnesium. In addition, opposing grains rocket engine technology holds the promise of facilitating superior metal combustion, especially in comparison to other relatively small solid rocket motors.

A large solid rocket motor, such as the Space Shuttle RSRM motor, generates molten metal droplets with a nominal diameter of 180μ. The metal droplets then ignite and combust with the water and carbon dioxide in the free gas stream. The oxidation process combusts the droplets at a rate of approximately 1 μper millisecond of diameter (of the droplets). The implication of these parameters is that 90 ms are typically required to consume the metal.

Smaller solid rocket motors often do not have sufficient residence time to fully combust metal fuels. The US Air Force Rocket Propulsion Laboratory developed a set of standard, heavyweight solid rocket motors for use in research and development evaluation. These motors are the Ballistic Analog Test and Evaluation System or BATES motors. Research has shown that the 15 pound BATES motor has an 8 to 10 mS residence time, and the 70 pound Bates motor has an approximately 22 mS residence time. These values can vary due to such factors as propellant burn rate and nozzle geometry.

During solid rocket propellant combustion, the metal droplets agglomerate, and then leave the surface of the solid propellant as a large drop. During their travel, the metal droplets are converted to metal oxide drops. The droplets then reach a maximum stable drop size. The maximum stable drop size is driven by the conditions inside the motor. The gas dynamic drag and shear forces in the accelerating gas field try to shred the droplets, while the van der Waals forces internal to the droplet try to hold it together. Under this stress, the droplets will shear down to a size that is stable in a given environment. In general, 1μ of droplet diameter has been seen for every inch of nozzle throat diameter. It is also generally observed that the resulting metal oxide droplet diameter is typically 70% of the parent metal droplet.

Another challenge associated with metal fuels and solid rocket motors, is that of two-phase flow losses. A typical, metallized solid rocket motor contains about 20% metal (aluminum) fuel. The combustion of this fuel will typically result in 32% by weight (moles per 100 grams at the throat) of the combustion products being metal oxide ($Al_2O_3$).

The metal oxide is known as a "condensable". Most solid rocket motor combustion products leave the rocket as a gas. Metal fuels combust to metal oxides, such as $Al_2O_3$, that exist as liquid droplets inside the rocket motor, and condense to solid particles upon cooling. 20% of the metal oxide condensables form large, coarse oxide droplets. The remaining 80% will be smoke (1 to 1.5μ in diameter).

These large, coarse, metal oxide droplets are the primary cause of two phase flow losses in solid rocket motors. Two-phase flow losses reduce the specific impulse of the rocket motor, due to the thermal and velocity lag resulting from a mixed flow of liquid droplets and combustion gases. The surface to volume ratio of the large, coarse, droplets is such that there is insufficient time to transfer the thermal energy from the interior of the droplet to the surrounding gas. Thus, the motor does not fully benefit from the energy generated by metal combustion.

A second source of loss is the gas dynamic drag of the large droplets on the flow of the combustion gases. Molten metal oxide does not behave according to perfect gas laws. Therefore, it does not expand and accelerate in the nozzle. Hence, the only mechanism for accelerating the metal oxide droplets is the transfer of momentum from the gases that surround it. In other words, in order for the metal oxide droplets to accelerate, the bulk combustion gases must decelerate.

Two-phase flow losses can have a significant effect on motor performance. Air Force Rocket Propulsion Laboratory research has shown that a solid rocket motor will lose 1% of specific impulse (Isp) performance for every 5% mass of aluminum that is added to the propellant. Since a typical, metallized solid rocket motor today contains 20% aluminum by mass, this translates into a 4% loss of specific impulse.

Two phase flow losses are even larger in smaller size, solid rocket motors. This is due to the acceleration profile in the nozzle. All rocket nozzles are sonic, i.e. Mach number equal to one or above, at the throat. However, larger rocket nozzles accelerate the flow over the course of as much as 10 feet, while smaller motors do the same in only a few inches. The larger rocket motors accelerate the two-phase flow over a longer period of time, and hence can do so much more efficiently, and consequently, suffer fewer losses.

When the metal oxide droplet is 1.5μ or smaller in diameter, it changes the situation significantly. These small droplets transfer heat much more effectively due to a more favorable surface to volume ratio. At a diameter of 1μ, the droplet begins to behave more like a gas, i.e. it will accelerate efficiently and cause little in the way of two-phase flow losses.

When OGRE solid propellant grains come together, there is a very small gap, on the order of 1 mm, between opposing grains. The gas dynamic flow in this gap is at or near the sonic condition, i.e., Mach number equal to 1 with a velocity of about 3,000 feet per second. This high-speed flow in a gap produces small metal and metal oxide droplets. This is due to the fact that the droplets are sheared in the violent high-speed flow in the gap. According to the present invention, a large percentage of the metal oxide droplets in opposing grains rocket engine rockets will be of a small size that facilitates high-combustion efficiency and heat transfer, while minimizing two-flow flow losses.

In a preferred embodiment, the opposing grains rocket engine thruster can use the industry standard propellant consisting of ammonium perchlorate/aluminum/hydroxy terminated polybutadiene (AP/Al/HTPB). When the thruster was tested with both propellant grains consisting of this type of propellant, controllability was clearly achieved.

In another preferred embodiment, one of the propellant grains is formulated to be oxidizer-rich, and the other to be fuel-rich, thereby providing a very safe and high performance approach to opposing grains rocket engine technology. Safety was improved because, unlike conventional solid propellants, neither the oxidizer-rich nor the fuel-rich grain can burn vigorously if ignited in isolation. It is only when these two grains are brought in close physical proximity that they burn vigorously.

In yet another preferred embodiment, an oxidizer-rich propellant grain is used in the OGRE thruster of the present invention. These oxidizer-rich propellant grains can be fabricated by pressing ammonium perchlorate (AP) in a fluorocarbon binder. This approach to propellant grain fabrication has proven to be mechanically robust and ballistically effective.

In still another preferred embodiment, an epoxy-based binder filled with 5μ magnesium fuel can be used. This approach produced a fuel grain with excellent mechanical properties. A number of OGRE prototype thruster tests have been conducted using this fuel.

In another preferred embodiment, a fuel-rich propellant formulation is provided for use in the OGRE of the present invention, said formulation being based on a phthalate plasticized polyvinyl chloride (PVC) binder filled with 5μ magnesium fuel. This approach produced a fuel grain with mechanical properties that had a lower than desired modulus, but was otherwise effective.

Yet another preferred embodiment uses a fuel propellant grain that consists solely of a PVC binder gumstock. This propellant combination was tested with the oxidizer rich propellant grain in an OGRE thruster of the present invention. These tests demonstrated that controllability was clearly achieved.

In a preferred general embodiment of the present invention, at least one propellant grain is oxidizer rich, and at least one propellant grain is fuel rich.

In another preferred embodiment, the propellants are not fuel rich and oxidizer rich. Rather, they are comprised of nitramines. For example, one propellant grain may be comprised of RDX, and another propellant grain may be comprised of ammonium perchlorate (AP). In such preferred embodiment, the propellant grain comprising AP decomposes into perchloric acid and ammonia, and the propellant grain comprising RDX and/or HMX decomposes into nitrogen dioxide and formaldehyde. The oxidizing species from each propellant grain have an affinity for the decomposition products of the opposing grain. This type of combustion environment provides great environment for rapid and effective combustion of metal fuels.

A simplest representation for the decomposition of these two oxidizers is:

$$NH_4ClO_4 \rightarrow NH_3 + HClO_4$$

$$(CH_2)_3(NNO_2)_3 \rightarrow 3(CH_2O) + 1.5(NO_2) + 2.25(N_2)$$

It has been observed that the cross-pair reaction of the above products produces an extremely quick and energetic reaction, resulting in very low-pressure exponents and early release of hydroxyl radicals (—OH) and its reaction with aluminum very close to the burning surface. The reaction pairs are as follows:

$$NH_3 + NO_2 \rightarrow H_2O + N_2$$

$$CH_2O + HClO_4 \rightarrow H_2O + CO_2 + CO + HCl$$

If aluminum is present, the —OH readily penetrates its oxide shell and ignites it very rapidly and close to the surface of the burning solid propellant surface.

Equalizing pressure within the combustion chamber (pressure vessel 3) is important in OGRE rocket engines, as it greatly reduces the force required by the actuator to move the propellant grains. The smaller the actuator force needed, the smaller/lighter actuator is needed, and hence the lower the power required to operate the actuator. This reduction in actuator size and require power further provides longer operating time and the ability to use a smaller/lighter battery.

Accordingly, a means of equalizing pressure is provided by the present invention. Specifically, as shown in FIG. 9, one or more pipes 71 may be provided within, adjacent and/or in communication with the pressure vessel 3, said pipes 71 operable to allow flow of combustion gases within the pressure vessel 3. In another more preferred embodiment, as illustrated in FIG. 2(a), a void space is provided between an interior side wall of the pressure vessel and the solid propellant grains, whereby to facilitate flow of combustion gases and equalization of pressure in the engine. Equalizing pressure is important, as it greatly reduces the force required by the actuator to move the propellant grains. The smaller the actuator force needed, the smaller/lighter actuator is needed. The smaller the actuator, the lower the power required. This gives either longer operating time or a smaller/lighter battery.

EXAMPLE 1

Preparation of Ogre Prototype Thruster Hardware

Figure 3:
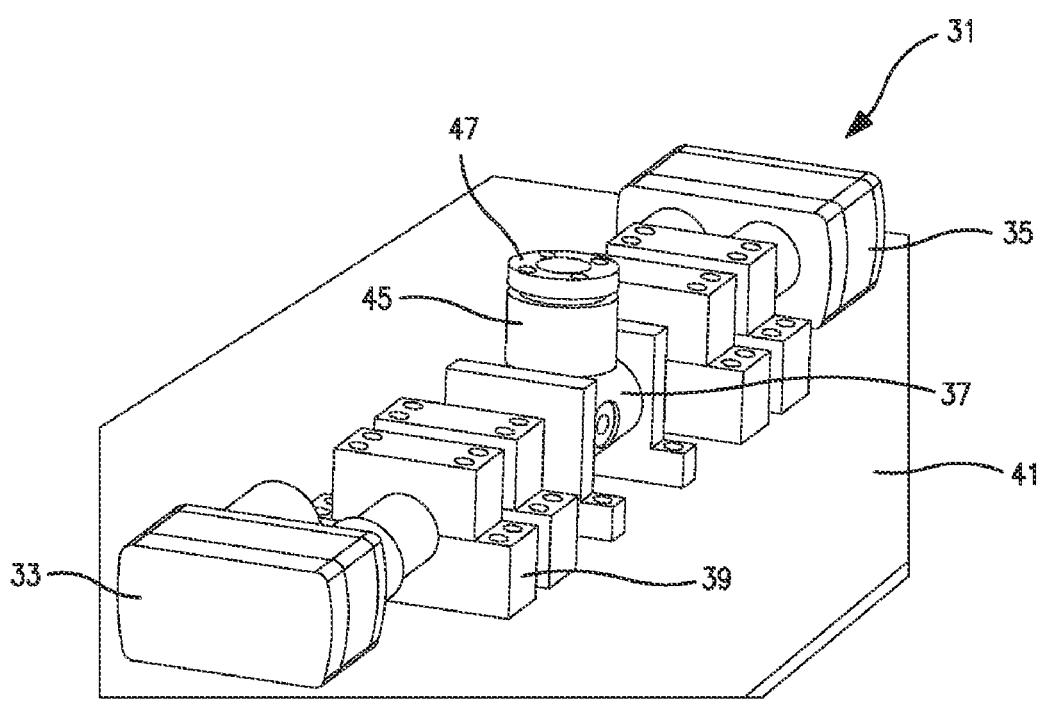
FIG. 3 is a perspective view of a prototype thruster of the present invention employed to test an opposing grains rocket engine, illustrating the actuators and combustion chamber.

The prototype thruster on test bench is shown in FIG. 3 generally at 31. This prototype employs two Thomson 12 VDC Performance Pak linear, ball-screw actuators 33, 35. The thrusters are capable of moving two propellant grains independently anywhere in the combustion chamber 37. Hold down blocks 39 fix the prototype on bench 41.

Each actuator 33, 35 has a stroke length of four inches, and is capable of exerting 750 lbs of force. These actuators 33, 35 are capable of extending and retracting at a maximum rate of 1.1 inches per second. Under motor control, the actuators 33, 35 can vary from 0 inches per second up to the stated 1.1 inches per second of travel rate. The propellant surfaces will be able to move apart or together at a rate of 2.2 inches per second.

Figure 4:
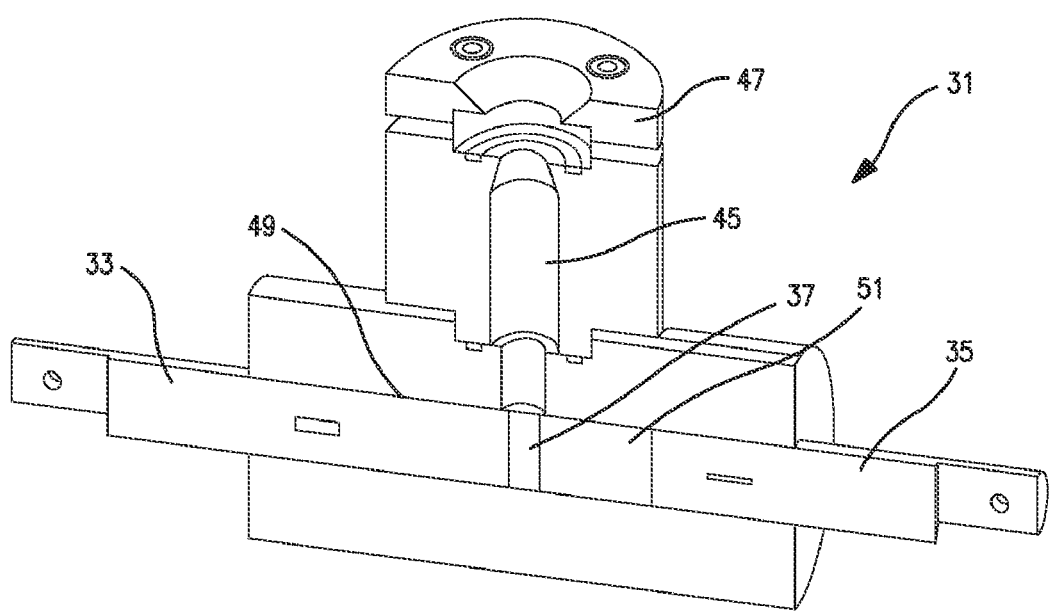
FIG. 4 is a cross-sectional view of the opposing grains rocket engine prototype thruster shown in FIG. 3, illustrating the post-combustion chamber, portions of the actuators used for moving the propellant grains, a post-combustion chamber, and a rocket nozzle connected to the post-combustion chamber.

The combustion chamber shown generally at 37 in FIG. 4 is centered between two actuators. Aluminum hold down blocks 39 were fabricated to secure and center the prototype. The entire assembly was secured to a table or bench using threaded fasteners. A cross-sectional view of the opposing grains rocket engine combustion chamber is shown in FIG. 4, illustrating the details of the internal construction.

The combustion chamber 37 was fabricated from cylindrical copper stock. The outside diameter of the chamber was 76.2 millimeters (mm). The internal bore diameter was 25.4 mm and the chamber was 152.4 mm long. A recess was machined into the top of the chamber to accommodate a post-combustion chamber 45.

Two pressure transducer ports were machined into the sides of the combustion chamber 37. A cross-sectional view of the fully loaded combustion chamber is shown in FIG. 4 with propellant grains 49, 51. End effectors 53, 55 with o-ring seals 57, 59 are connected to actuators (not shown) for propellant grains 49, 51. The end effectors 53, 55 attach to the actuators 33, 35 in such a way that the actuator 33 or 35 does not impart up and down side loads to the solid propellant 49, 51. This was achieved by pinning the actuator end attachment into a slot in the end effectors, thus giving it room and freedom to pivot.

A post-combustion chamber 45, shown in FIG. 4, increases the residence time of the combustion gases inside the motor before discharge from nozzle 47. This leads to more complete combustion, and increased propulsive efficiency. The post-combustion chamber 45 had an outside diameter of 76.2 mm.

The gas flow leaves the opposing grains rocket engine gap and enters the original 12.7 mm diameter port in the primary combustion chamber. The gases then expand to the inner diameter of the post-combustion chamber port (19.05 mm). The post-combustion chamber port was 47.9 mm long, and then tapered down to an inner diameter of 12.7 mm over a distance of 11.9 mm. This 12.7 mm inner diameter matched the entrance section of the nozzle.

Figure 5:
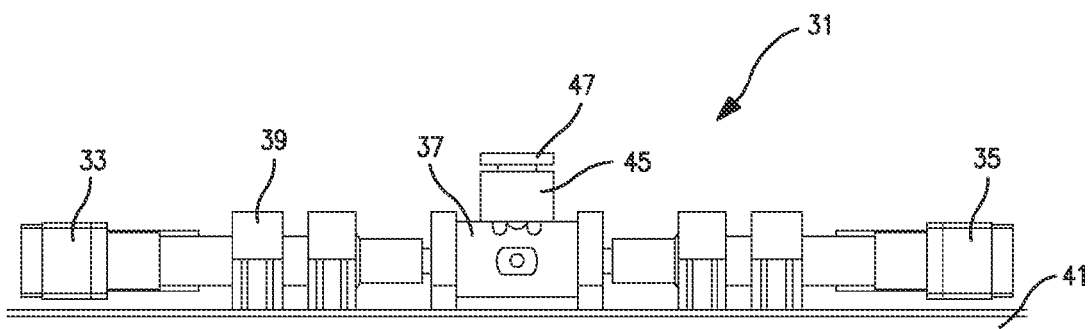
FIG. 5 is a side view of an opposing grains rocket engine prototype thruster of the present invention with a post-combustion chamber, illustrating the position of pressure transducers and a thermocouple used to measure pressure and temperature of combustion gases, respectively, which data can be used to control the position of the actuators and the burn rate.

FIG. 5 illustrates the completed opposing grains rocket engine (OGRE) prototype thruster hardware with temperature and pressure sensors. One additional pressure transducer 61, and one thermocouple 63 were also tapped into post-combustion chamber 45, FIG. 5.

EXAMPLE 2

Opposing Grains Rocket Engine Prototype Thruster Control System

National Instruments' LabVIEW™ software was used as the basis for controlling the thruster and acquiring data on the opposing grains rocket engine prototype control system. The LabVIEW™ controlled opposing grains rocket engine (OGRE) system consists of a combination of hardware and software. In particular, the hardware consisted of two Pololu SMC04™ brushed motor controllers, a power supply for excitation voltage, a power relay, which would allow the power to be cut in the event of an abort situation, and control and feedback lines. The control and feedback lines terminate in a data acquisition and control system. The wires were connected to multiple differing terminal blocks installed in a National Instruments SCXI-1001 12 slot chassis.

The Pololu SMC04™ had the ability to control brushed DC motors with current requirements of up to 30 amps continuous. The SMC04™ had multiple controlling interfaces including a serial protocol for PC and microcontroller-based applications, a pulse-width interface for connection to radio control equipment, and an analog voltage interface for simple potentiometer control. In addition, the SMC04™ includes feedback alternatives which allows for closed-loop control of position or speed.

The opposing grains rocket engine (OGRE) control software used a serial protocol interface. The software consisted of a custom Virtual Instrument™ (VI) written in LabView 8.21™. This instrument VI implemented a parser which read and parsed English-like statements. Multiple statements combined to build a test script.

EXAMPLE 3

Acuation System Calibration

It was necessary to calibrate the actuator internal displacement sensors before test firing. A Penny & Giles SLS190 Linear Variable Displacement Transducer™ (LVDT) identified as 70 in FIG. 6 is capable of greater than 0.01 mm resolution, with a repeatability of 0.01 mm was employed to calibrate the LVDT. This LVDT sensor 70 is shown to the right of the bench prototype in FIG. 6. As expected, this sensor proved to be highly linear in output.

FIG. 6 shows the LVDT, which appears as a cylinder to the right of the actuator, integrated into the experimental setup, so that it sees the same displacement as the actuator. Both actuators contained an internal displacement sensor. The sensors were calibrated by comparing their output to that generated by the LVDT 70. All three sensors proved to be highly linear and repeatable during these calibration runs.

EXAMPLE 4

Test of Automated Control of an Opposing Grains Rocket Engine Thrust

The objective of this test was to demonstrate repeatable, automated control of an opposing grains rocket engine (OGRE) thruster. During this test, the most successful and responsive propellant combination that had been tested to date, namely, an oxidizer-rich grain consisting primarily of ammonium perchlorate with a perfluorcarbon based binder, and a fuel-rich grain consisting of a polyvinylchloride-based binder with magnesium, was used.

This test enabled the empirical derivation of an optimum set of control scripts for the prototype thruster. For example, it was found that advancing the propellant grains too aggressively could result in a number of adverse outcomes, including over pressurization of the motor, motor extinguishment, or even mechanical damage to the propellant grains. If the propellant grains were actuated at too slow of a rate, the thruster may develop insufficient chamber pressure and a low thrust. In the final analysis, sixteen preliminary tests were necessary in order to determine the right combination of actuation rate, actuation time, and dwell time, to achieve the desired prototype thruster performance for this test.

A control script was used during this test, in which the actuator advances for 70 ms, causing the chamber pressure to rise. The actuator then pauses for 300 ms. At the beginning of this pause, the opposing grains are in relatively close proximity. For this reason, the opposing grain combust at a relatively high burning rate due to the physics of the OGRE effect. However, because the actuators are no longer advancing, the propellant grain surfaces regress away from one another, causing a decrease in burn rate as the physical separation increases.

In this particular example, one propellant grain was oxidizer rich, and one propellant grain was fuel rich, allowing maximum sensitivity to the OGRE effect. Thus, when the propellant surfaces regress such that the surfaces are 5 mm apart, the combustion extinguished altogether, thus causing the chamber pressure to drop to zero. This is repeated four times to produce a train of four propulsive pulses. The system then dwells for 750 ms, and then begins another train of four pulses. This process was repeated until the actuators extended past their limit for maximum throw distance, as defined in the control system "red line" values. At that point, the actuators retracted and the test was completed.

Figure 7:
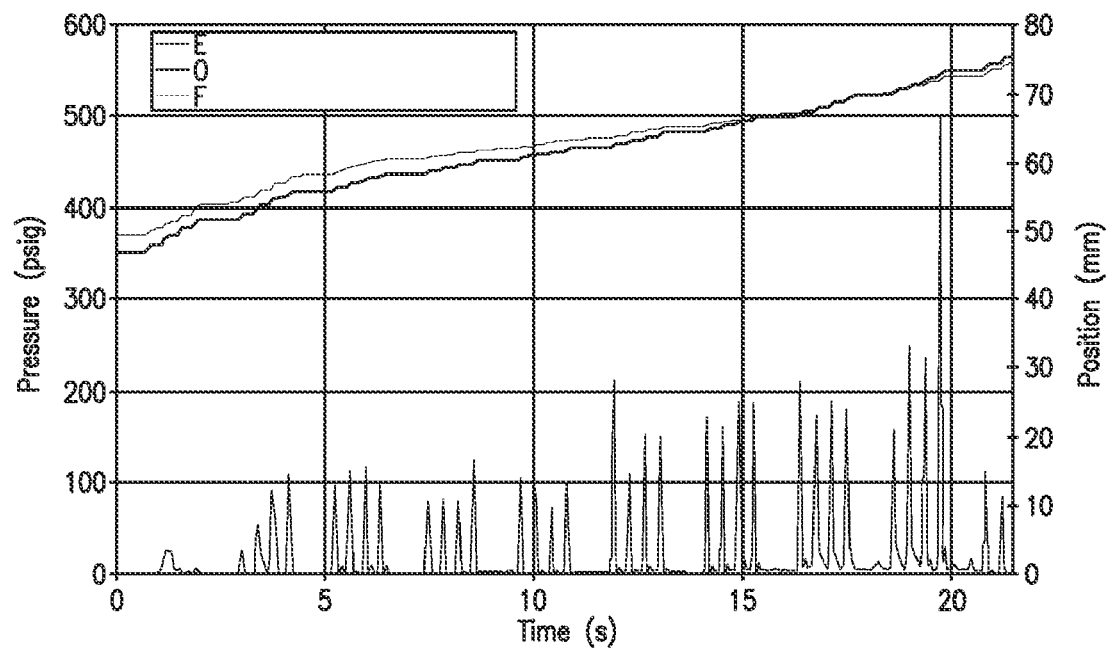
FIG. 7 is a plot of the pressure trace with respect to time for an opposing grains rocket engine thruster of the present invention, illustrating pulses, complete extinguishments/re-ignitions, and mission time.
Figure 8:
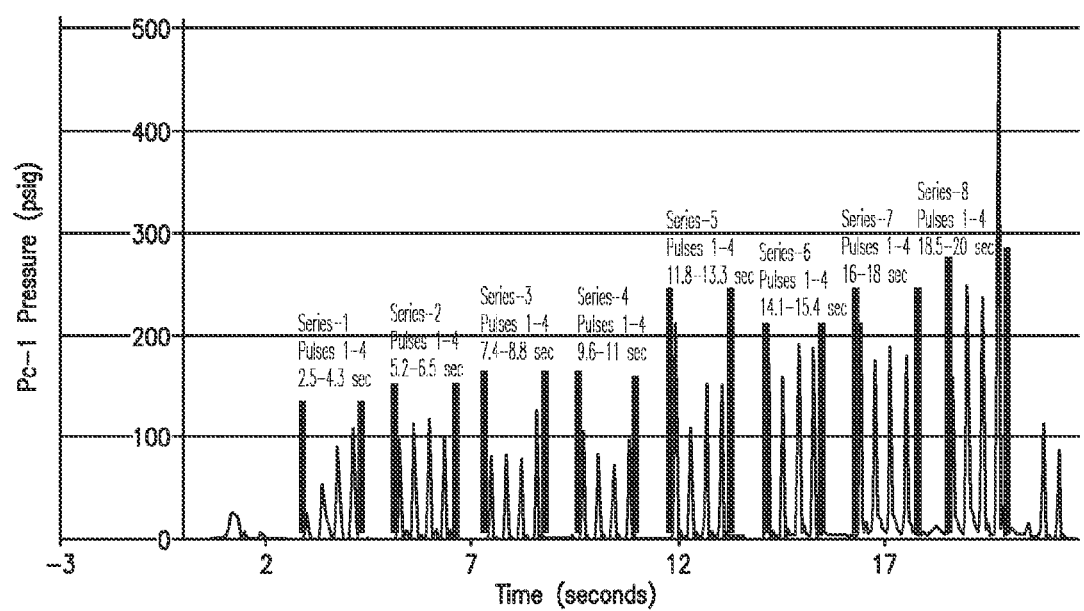
FIG. 8 is a plot of the pressure trace with respect to time for the opposing grains rocket engine of the present invention, illustrating a series of sets of pulse trails, and the pulses in each pulse trail.

A plot of the pressure trace with respect to time is shown in FIG. 7. The way in which these tests were divided into a series of eight sets of pulse trains with each pulse train containing four pulses is illustrated in FIG. 8. This test demonstrated a chamber pressure that rose above 100 psi immediately following the ignition event. During this test, the opposing grains rocket engine thruster achieved the intended results of the programmed control strip and produced 35 pulses, 25 complete extinguishments and reignitions, and greater than a 20 second mission time.

These results represent breakthrough levels of solid rocket motor controllability. This is especially the case since only a single pyrotechnic igniter was used for initial motor ignition. This performance is in sharp contrast to competing technologies, such as pintles and hot gas valves, which generally cannot reliably extinguish, and when extinguished, generally require another pyrotechnic igniter to reignite.

FIG. 8 illustrates the way in which the entire test was divided into a series of eight sets of pulse trains. Each pulse train contains four pulses. The duration of these pulse trains was consistent for such an early stage of technical development.

EXAMPLE 5

Test of OGRE with Pyrogen Igniter

A charge of composite solid propellant was added to the ignition system in addition to the pyrogen igniter. A composite solid propellant based on ammonium perchlorate, strontium nitrate, magnesium, aluminum, and hydroxy terminated polybutadiene was selected for use as a booster charge for the opposing grains rocket engine prototype thruster ignition system. The inherent ballistics of this composite propellant would burn sufficiently hot (in excess of 3,500° F.). The duration of the igniter booster charge could be controlled by the physical dimensions of the propellant grain. The thicker the propellant grain, the longer it will burn.

The composite solid propellant was cut into a disk roughly the same diameter as the opposing grains rocket engine propellant grains, i.e. approximately 1 inch. This composite solid propellant disc was approximately 1 mm thick. The disc was adhered to the fuel grain with a very small quantity of epoxy. The combination of a composite solid propellant booster charge and a pyrogen igniter was sandwiched between the two opposing grains rocket engine propellant grains.

As discussed above, the present invention provides a solid propellant propulsion system, and an opposing grains rocket engine. In addition, the present invention provides various methods of controlling the burn rate, igniting, extinguishing, and reigniting solid propellants. Importantly, although specific embodiments of the present invention have been disclosed herein, those having ordinary skill in the art will understand that changes can be made to the specific embodiments without departing from the spirit and scope of the invention. For example, the propulsion system described above can be used in various application requiring a gas generator.

Thus, the scope of the invention is not to be restricted to the specific embodiments. Furthermore, it is intended that the appended claims cover any and all such applications, modifications, and embodiments within the scope of the present invention.

List Of Drawing Element

1: opposing grains rocket engine of the present invention
3: outer rocket casing (or pressure vessel)

Figure 2B:
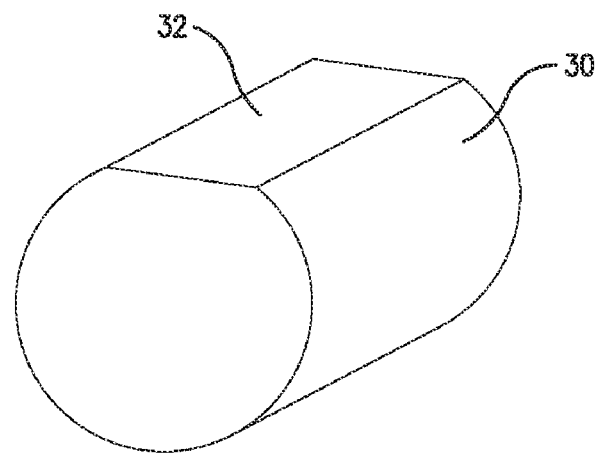
FIG. 2(b) is a perspective view of a partially cylindrical propellant grain having a flattened top surface, which provides a void space between the propellant grain and an inside wall of the pressure vessel to facilitate flow of combustion gases to effect pressure equalization in the opposing grains rocket engine illustrated in FIG. 2(a).

5: solid propellant grain
6: burning end of solid propellant grain 5
7: solid propellant grain
8: burning end of solid propellant grain 7
9: actuator
11: actuator
13: gap
15: nozzle
17: case bonded fuel-rich propellant grain
19: rocket motor shown in FIG. 2(a)
21: nozzle
23: oxidizer-rich propellant grain
25: oxidizer-rich propellant grain
27: actuator
29: actuator
30: propellant grain shown in FIG. 2(b)
31: OGRE prototype thruster shown in FIG. 3
32: flattened top of propellant grain 30 shown in FIG. 2(b)
33: ball screw actuator
35: ball screw actuator
37: combustion chamber
39: hold down blocks
41: bench
45: post-combustion chamber
47: nozzle
49: propellant grain
51: propellant grain
61: pressure transducer
63: thermocouple
70: Penny & Giles SLS190 Linear Variable Displacement Transducer™
71: pressure equalizing pipes
73: male cone-shaped propellant grain
75: female cone-shaped propellant grain

What is claimed is:

1. A propulsion system, comprising:
   (a) a pressure vessel having an interior and exterior,
   (b) a rocket nozzle connected to the pressure vessel,
   (c) propellant slidably disposed within the interior of the pressure vessel, said propellant comprising at least two discrete solid propellant grains, each of said propellant grains having an end surface where combustion is initiated and occurs, said end surfaces opposing one another in an end-to-end spaced relation, thereby forming a gap between said end surfaces, said propellant grains being movable relative to one another, and
   (d) one or more actuator means connected to said solid propellant grains, said actuator means being operable to selectively move burning ends of solid propellant grains relative to one another, whereby to control rate of combustion of the solid propellant grains by varying spacing distance between the burning ends of the solid propellant grains.

2. The propulsion system of claim 1, wherein moving burning ends of the solid propellant grains closer together increases erosive burning of propellant grains and increases pressure of combustion gases inside the pressure vessel, thereby throttling up the propulsion system.

3. The propulsion system of claim 1, wherein moving the burning ends of the solid propellant grains further apart, decreases or eliminates erosive burning and decreases pressure of combustion gases inside the engine, thereby throttling down and/or extinguishing burning of propellant grains.

4. The propulsion system of claim 1, wherein said actuator means is simultaneously slides said solid propellant grains relative to one another within the pressure vessel, thereby varying the spacing between the burning ends of the solid propellant grains.

5. The propulsion system of claim 1, wherein the actuator means are responsive to temperature and/or pressure of combustion gases in the engine.

6. The propulsion system of claim 1, wherein two solid propellant grains are slidably disposed inside the interior of the pressure vessel, and actuator means are connected to each of the solid propellant grains to effect sliding movement of solid propellant grains.

7. The propulsion system of claim 1, wherein one propellant grain is shaped like a male cone, and an opposing fuel grain as a female cone.

8. The propulsion system of claim 1, wherein at least one propellant grain is oxidizer rich, and at least one propellant grain is fuel rich.

9. The propulsion system of claim 1, wherein at least one propellant grain is comprised of a nitramine, such as RDX and/or HMX, and at least one other propellant grain is comprised of ammonium perchlorate (AP).

10. An opposing grains rocket engine comprising:
    (a) a pressure vessel,
    (b) solid propellant grains slidably disposed in the pressure vessel, said propellant grains comprising at least two discrete solid propellant grains, each of said propellant grains having an end surface where combustion is initiated and occurs, said end surfaces opposing one another in an end-to-end spaced relation, thereby forming a gap between said end surfaces, said propellant grains being movable relative to one another,
    (c) a rocket nozzle connected to the pressure vessel, and
    (d) one or more actuator means operable to move the two opposed solid propellant grains relative to one another in the pressure vessel, whereby to vary spacing between burning ends of the solid propellant grains.

11. The opposing grains rocket engine of claim 10, wherein the actuator means are operable to throttle up the engine by sliding closer together the two opposed solid propellant grains so as to decrease spacing between the burning ends of the solid propellant grains and increase erosive burning and the pressure of combustion gases in the engine.

12. The opposing grains rocket engine of claim 10, wherein the actuator means are operable to throttle down or extinguish combustion in the engine by sliding further apart the solid propellant grains, whereby to increase spacing between the burning ends of the solid propellant grains and decrease erosive burning and pressure of combustion gases in the engine.

13. The opposing grains rocket engine of claim 10, wherein the rocket nozzle is positioned at about a center of gravity of the engine, and the actuator means are operable to move the two opposed solid propellant grains toward the center of gravity as the solid propellant grains are consumed so as to maintain constant the center of gravity of the engine.

14. The opposing grains rocket engine of claim 10, wherein as the two opposed solid propellant grains are consumed, their burning ends are moved toward one another at a rate approximating the combustion of the solid propellant grains, thus maintaining constant the center of gravity of the rocket engine.

15. The opposing grains rocket engine of claim 10, further comprising a pyrotechnic igniter disposed adjacent the solid propellant grains, whereby to initiate ignition of solid propellant grains.

16. The opposing grains rocket engine of claim 10, wherein an elongated fuel-rich solid propellant grain having a first end and a second end opposite the first end is positioned at about a center of gravity of the engine, oxidizer-rich solid propellant grains are positioned adjacent each end of the fuel-rich solid propellant grain in an end-to-end relationship, and actuator means are operable to move the burning ends of both oxidizer-rich solid propellant grains relative to the burning ends of the fuel-rich solid propellant grain.

17. The opposing grains rocket engine of claim 10, wherein a void space is provided between an interior side wall of the pressure vessel and the solid propellant grains, whereby to facilitate flow of combustion gases and equalization of pressure in the engine.

18. The opposing grains rocket engine of claim 10, further comprising one or more pipes disposed within, adjacent and/or in communication with the pressure vessel, said pipes operable to allow flow of combustion gases within the pressure vessel.

19. A method for controlling the burn rate of solid propellant grains undergoing combustion in an opposing grains rocket engine having at least two discrete solid propellant grains each having an end surface where combustion is initiated and occurs, said end surfaces opposing one another in an end-to-end space relation thereby forming a gap between said end surfaces where burning occurs, and combustion gases from burning propellant grains are discharged through a rocket nozzle connected to the rocket engine, the method comprising:

moving burning surfaces of at least two discrete solid propellant grains relative to one another to vary a distance or spacing between burning ends of the solid propellant grains, thereby adjusting the rate of burning of the solid propellant grains.

20. The method of claim 19, wherein moving burning ends of the solid propellant grains closer together, increases erosive burning and heat flux to burning surfaces and effects an increase in pressure of combustion gases in the engine, thereby throttling up the rocket engine.

21. The method of claim 19, wherein moving burning ends of the solid propellant grains farther apart, decreases erosive burning and heat flux and decreases pressure of combustion gases in the engine, thereby throttling down the rocket engine.

22. The method of claim 19, wherein moving further apart burning ends of the discrete solid propellant grains extinguishes combustion in the rocket engine.

23. The method of claim 19, wherein said actuator means connected to the solid propellant grains moves opposed ends of the solid propellant grains relative to one another to control burning in the rocket engine.

24. The method of claim 19, wherein said actuator means moves burning opposed ends of solid propellant grains toward a center of gravity of the rocket engine, whereby to maintain approximately constant the center of gravity of the engine during burning and consumption of the solid propellant grains.

* * * * *